United States Patent [19]
Balke et al.

[11] 4,150,717
[45] Apr. 24, 1979

[54] INTERLOCKING CHECKER TILE

[75] Inventors: George L. Balke, Cleveland; Edward F. Jablonski, Brecksville, both of Ohio

[73] Assignee: Arthur G. McKee & Company, Independence, Ohio

[21] Appl. No.: 757,638

[22] Filed: Jan. 7, 1977

[51] Int. Cl.² ............................................. F28D 17/00
[52] U.S. Cl. ...................................... 165/9.1; 165/9.4
[58] Field of Search ..................... 164/9.1, 9.2, 9.3, 10

[56] References Cited

U.S. PATENT DOCUMENTS

| | | | |
|---|---|---|---|
| 2,622,864 | 12/1952 | Hasche | 165/10 X |
| 3,220,715 | 11/1965 | Kinney | 165/9.1 X |
| 3,436,064 | 4/1969 | Hauth et al. | 165/9.1 |

FOREIGN PATENT DOCUMENTS

| | | | |
|---|---|---|---|
| 680458 | 5/1930 | France | 165/9.1 |
| 871219 | 4/1942 | France | 165/9.1 |

*Primary Examiner*—Albert W. Davis, Jr.
*Attorney, Agent, or Firm*—Bosworth, Sessions & McCoy

[57] ABSTRACT

Disclosed are checker tiles for regenerative heating stoves, each tile having the general shape of a parallelepiped, the preferred tile being square in plan, having apertures extending through the tiles and having complementary ribs and grooves extending on the ends of the tile between adjacent apertures to interlock the tiles with contiguous end-abutting tiles and prevent substantial lateral movement thereof when the tiles are arranged in stacked overlapping relation.

Also disclosed is supporting means for checker tiles providing for low friction and preferential sliding of horizontal contacting surfaces to permit lateral relative movement between the lowermost course of tiles and supporting means that avoids damage to tiles on dimensional changes of the tiles or supporting means due to temperature changes in operation of the stove.

26 Claims, 17 Drawing Figures

INTERLOCKING CHECKER TILE

FIELD OF THE INVENTION

This invention relates to regenerative heating stoves in which checkerwork formed of checker tile is heated by hot gases and then gives up its heat to heat other gases passing through the checkerwork, to improved checker tile for such checkerwork, and to means for supporting checker tile in such checkerwork in such stoves.

Stoves of this type are widely used in connection with blast furnaces for heating combustion air supplied to the furnace, and therefore the invention will be discussed in connection with such stoves, although the invention is applicable for use in other types of heating stoves or other apparatus in which the checker tile or the checker tile supporting means of the invention may be used.

BACKGROUND OF THE INVENTION

In blast furnace operation, it is common practice to preheat incoming air for the blast furnace, by passing the air through a heated checkerwork of checker tiles in a large regenerative stove. The checker tiles in the stove have gas passages to allow hot gases leaving the blast furnace to flow through the checkerwork and heat the checkerwork by transfer of heat from the hot gases to the tiles, and later to allow air that passes to the blast furnace to pass through the checkerwork and to be heated by transfer of heat to the air from the thus previously heated checker tiles.

For optimum results in such service, the checker tiles should be so shaped that they can be readily assembled into the checkerwork by being fitted together with laterally and vertically adjacent tiles, and with supporting means below tiles in the lowermost layer of tiles in the checkerwork. Moreover, the tiles should be such that after assembly in the checkerwork they are securely located relative to the adjacent tiles of the checkerwork that abut their sides and their top and bottom ends.

After assembly into the checkerwork, the tiles should provide passages through the checkerwork through which passages hot gases and air can alternately pass without excessive pressure drop which could be damaging or dangerous to the shell or other structure of the large stoves, and which passages provide large heat transfer areas.

Since transfer of heat to and from checker tiles and operation of the stove causes the tiles to change dimensions due to thermal expansion and contraction, the tiles should be so supported relative to each other and to the supporting means for the checkerwork that relative movements between the tiles and between the tiles and supporting means is permitted to allow for such changes in dimensions of the tiles without damage to the tiles or supporting means.

Furthermore, the supporting means at the bottom of the stove supporting the checkerwork of checker tiles must be such as to permit relative movements between the supporting means and the tiles between the supporting means and supporting columns or other fixed supports to allow for movements arising from expansion and contraction of the tiles and supporting means during heating and cooling of the supporting means and the checkerwork supported by it.

The checker tiles should be strong enough, and have securing means as to permit the tiles to be assembled into a checkerwork without crushing of the tiles. The tiles must also be strong enough to withstand the weight of tiles above them in the checkerwork under high temperatures and changes in temperatures, and to withstand degradation due to the movement of hot gases and the action of gas-laden impurities.

Failure of checker tiles in the checkerwork can cause checker tiles above the failure location to collapse, thereby destroying a substantial portion if not all of the checkerwork. Crushed or damaged checker tiles can pile up and cause clogging of gas passages and excessive gas pressure drop. In such cases, the stove must be taken out of service and the collapsed checkerwork removed and new checkerwork prepared and installed. It is important therefore that the checker tiles and checkerwork built of them be able to resist failure under the severe conditions of use, and to be readily removed and replaced if failure does occur for any reason.

Moreover, it is desirable that the checker tiles be of such shape that they can perform the above indicated functions and yet be manufactured without excessive cost as because of molding problems or waste of material.

It is an object of the invention to provide checker tiles and supporting means that can provide all or as many as desired of the above indicated desirable features, and which can avoid most or all of the problems indicated above.

SUMMARY OF THE INVENTION

The invention provides a checker tile that has generally parallel opposed ends and four generally flat sides intersecting the ends, forming a body for the tile that has the general shape of a parallelepiped with cross sections parallel to its ends and its sides and ends in generally the form of rectangles, the tile having a plurality of openings that extend through the tile between its ends with elongated ribs extending longitudinally between pairs of openings on an end of the checker tile terminating and entirely within the boundary of the tile, and elongated grooves extending longitudinally between openings on the other end of the tile and terminating entirely within the boundary. Preferably, the checker tile is such that all the ribs are on one end of each checker tile and all the grooves are on the other end of the checker tile. Also preferably, the ribs and grooves are complementary in that the grooves extend between the same openings on the tile as the ribs, and are of cross sectional shapes that the grooves can receive but closely fit the ribs on the tiles of adjacent ends.

Furthermore, the checker tile preferably is of square configuration in plan, although it may be of elongated rectangular configuration in plan, provide a portion of such checker tile to be removed by cutting or breaking to permit such tile to be located in the checkerwork where it is near and fits within a curved inner contour of the stove shell.

Furthermore, preferably the checker tile has at its sides elongated grooves extending between the ends of the tile and adapted to mate with corresponding grooves on the sides of abutting adjacent tiles to form gas passage openings extending between the ends of the abutting adjacent tiles.

Furthermore, the invention provides supporting means at the lower end of a checkerwork made up of checker tiles, which supporting means comprises an apertured metal rigid supporting structure, such as a grid, that supports on its upper surface in slidable relation a course or layer of a plurality of metal shoes that are adapted to support the lowermost checker tiles near the checkerwork, one of the upper or lower surfaces of the shoes being more smoothly finished than the other surface of the shoes to provide lower friction at such smoother surface of the shoe to permit preferential relative sliding at said surface of the shoe between said shoe and a surface of a tile or other part that contacts the shoe where dimensional changes in the tiles or supporting structures occur because of temperature changes.

The invention also provides supporting means as described in the preceding paragraph in which there are two or more layers of said shoes, one of said layers resting on a lower layer of said shoes and in which the abutting contacting surface of the shoes in at least one of said layers are finished substantially smoother than the non-abutting surfaces of said shoes, to permit reduced friction and lower preferential sliding between said shoes in response to dimensional changes due to temperature.

It is a further object of the invention to provide such checker tiles and such supporting means that are durable and resistant to the severe conditions of loading, high temperatures, and wide temperature fluctuations, and that can be manufactured at reasonable cost.

BRIEF DESCRIPTION OF DRAWINGS

These and other objects, features and advantages of the invention will be apparent from the following description of preferred embodiments of the invention in connection with the accompanying drawings in which.

DESCRIPTION OF PREFERRED EMBODIMENTS

Figure 1:
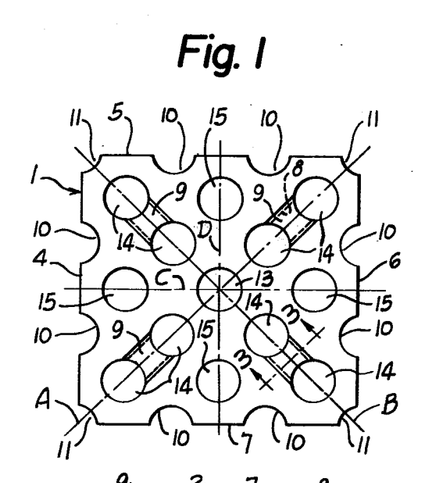
FIG. 1 is a plan, to a reduced scale, of a checker tile constituting a preferred form of the invention.
Figure 2:
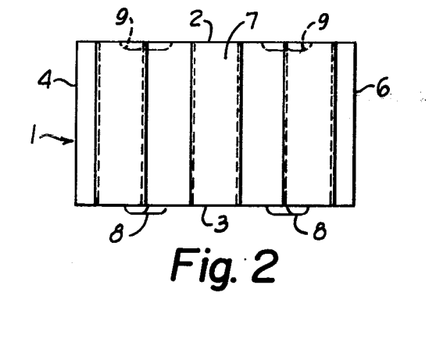
FIG. 2 is a side elevation of the tile of FIG. 1, to the same scale.
Figures 3, 4:
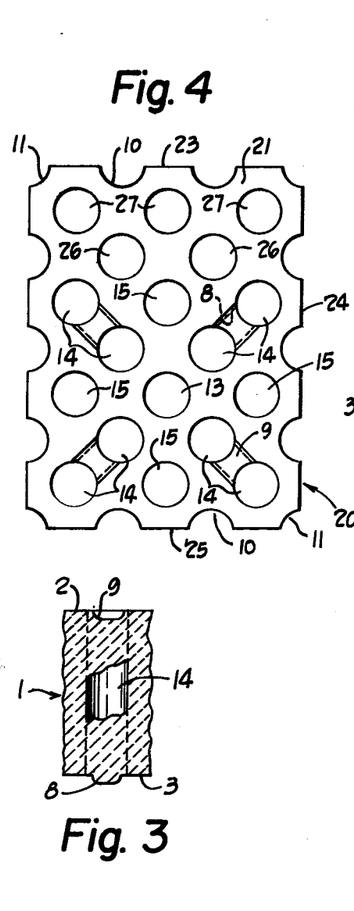
FIG. 3 is a section along line 3—3 of FIG. 1, to the same scale.
FIG. 4 is a plan of another checker tile embodying the invention, to the scale of FIG. 1.

As shown in FIGS. 1, 2 and 3, the preferred embodiment of the invention is a checker tile 1 having parallel ends 2 and 3 and sides 4, 5, 6, and 7, of which sides 4 and 6 are parallel and 5 and 7 are parallel. The ends are essentially square, and the cross sections of the tile parallel to the ends are also essentially square. Each of the ends 2 and 3 is generally flat except for the ribs 8 and grooves 9 to be described later. Each of the sides is essentially flat except for the channels or grooves 10 and 11 that extend from end to end for purposes to be described later.

Tile 1 has a central aperture 13. Other apertures 14 are disposed in a row along each of the diagonal axes A and B of each end, the apertures in each such row including common aperture 13 being spaced equally along each diagonal axis, and the apertures along both diagonal axes being equally spaced.

Preferably, as shown, other apertures 15 are arranged so that they are equally spaced from the center aperture along axes C and D parallel to the sides of the tile and intersecting the juncture of axes A and B at the center of aperture 13. Preferably, apertures 14 and 15 are disposed and equally spaced in rows parallel to the diagonal axes A and B and to axes C and D parallel to the sides of the tile, and other rows of apertures 14, 15, 14 parallel to the sides of the tile and to diagonals A and B.

These apertures extend through the tile from end to end of the tile, and intersect the ends of the tile. Preferably, the apertures are all circular in cross section, and of equal cross sectional size to promote uniformity of gas flow across the cross section of each tile and across the cross section of the checkerwork made up of the tiles. The apertures may be of other cross sections, preferably symmetrical, such as square, hexagonal, octagonal or elliptical and may be of unequal cross sectional sizes.

Half aperture channels or grooves 10 on the sides and quarter-aperture channels or grooves 11 at the corners of the tile are located so that they define portions of the apertures lying in the rows along axes A, B, parallel to axes C or D parallel to the sides of the tile so that when the side surfaces of the tile abut the side surfaces of adjacent tiles in the checkerwork in a layer, these grooves cooperate with mating grooves of adjacent abutting tiles to define complete apertures for passage of gas through the tiles and the checkerwork made up of the tiles.

Tile 1 also has at one end 3 four elongated ribs 8 that protrude above the planar surface of the end and extend between two apertures 14 in rows angularly disposed to the sides of the tile, being disposed in the illustrated embodiment in the rows along diagonal axes A and B. These ribs do not extend to the boundary defined by the sides of the tile, but rather terminate within such boundary; in the illustrated embodiment, they terminate at the walls of apertures between which the ribs are disposed.

The opposite end of the checker tile has complementary grooves 9 that are disposed similarly to the ribs, and in the illustrated embodiment extend between the same apertures as do the ribs.

Preferably, as shown in FIGS. 1-3, the ribs all have the same height, width and depth and are of uniform cross section; and the grooves all have the same height and width and depth, which are slightly larger than the height, width and depth of the ribs and are of uniform cross section, so that the ribs of checker tiles in one layer can readily but closely fit the grooves of checker tiles of an abutting layer.

As shown in FIG. 4, a tile 20 embodying the present invention may be elongated in shape, having elongated rectangularly shaped parallel generally, flat ends of which end 21 is shown, and parallel sides 22, 23, 24, and 25. The width of tile 20 is the same as that of tile 1. A portion of this tile, generally corresponding to the tile of FIGS. 1-3, has the apertures 13, 14 and 15 arranged as in the tile of FIGS. 1-3; the remaining portion of the tile has identical apertures 26 and 27 arranged in rows corresponding to the rows of apertures 14, 14, and 14, 15 and 14 of tile 1 of FIGS. 1-3 parallel to an end of the tile. Tile 20 also has side grooves 10 and corner grooves 11 as in tile 1 and used for the same purpose. Tile 20 also has four diagonal ribs 8 in one end and four complementary grooves 9 in the other end, shaped, spaced, and located as are the ribs 8 and grooves 9 of tile 1.

Figure 5:
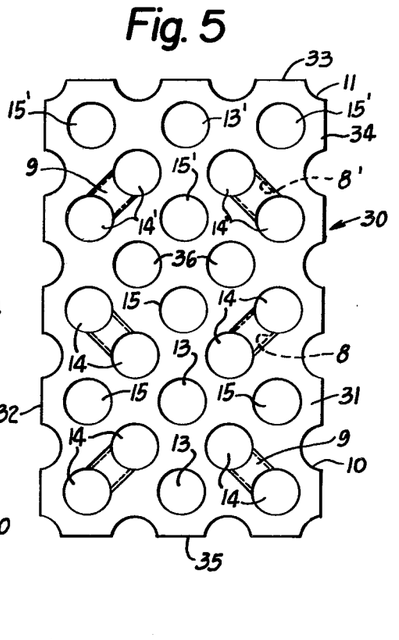
FIG. 5 is a plan of still another checker tile embodying the invention, to the scale of FIG. 1.

FIG. 5 illustrates that a tile 30 embodying the invention may also be made to have generally flat ends and cross sectional shape in the form of a rectangle more elongated than that of the rectangle of tile 20. The illustrated tile 30 has parallel ends of which one end 31 is shown. The tile has parallel sides 32, 33, 34 and 35. The width of tile 30 is the same as that of tile 1. The major portion of tile 30 is very similar to that of tile 1 in that tile 30 has through apertures 13, 14, and 15 and ribs 8 and grooves 9 identical in size and location to the apertures 13, 14, and 15 and ribs 8 and grooves 9, of tile 1. Tile 30 also has a minor portion containing a row of apertures 36 parallel to the short sides of the tile, and an arrangement of apertures 13', 14' and 15' as well as ribs 8' and grooves 9' identical with apertures 13, 14, and 15 and ribs 8 and 9 on a major portion of tile 1 that terminates at a row formed by apertures 14, 14 immediately adjacent a central row, parallel to a side of tile 1 along axis C or D and made of apertures 15, 13, 15 on tile 1. Tile 30 has external grooves 10 in its sides and corner grooves 11 corresponding in size and spacing to grooves 10 and 11 of tile 1.

Tiles 20 and 30 of FIGS. 4 and 5 preferably are used in the portions of the checkerwork near the curved inner surface of the outer shell of the stove or near curved stack surfaces, the portions of tiles 20 and 30 extending beyond the portion corresponding to the square cross section of tile 1 of FIGS. 1-3 being adapted to be cut or broken off to fit such curved surfaces. If desired, such extending portions may have no apertures or side grooves.

Figure 6:
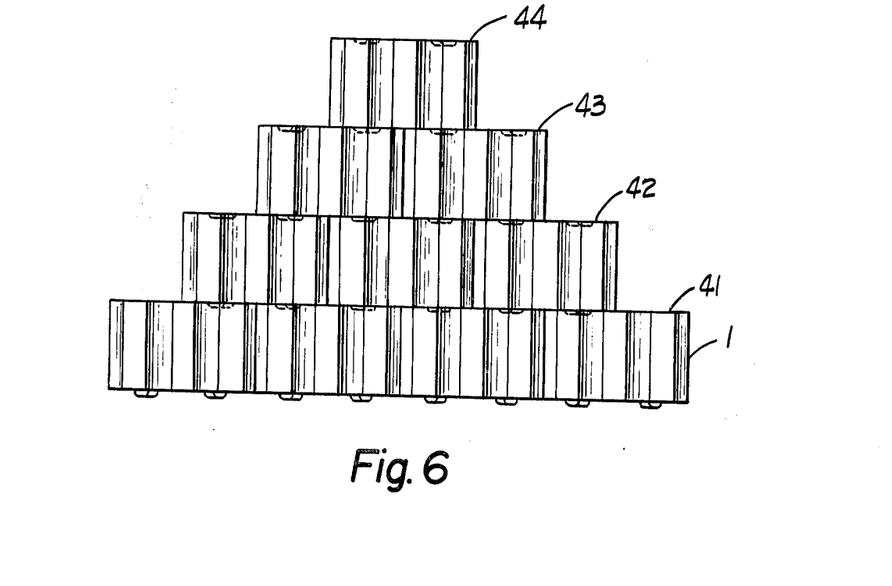
FIG. 6 is a side elevation, to a scale smaller than that of FIG. 1, showing a number of checker tiles stacked in several partial courses or layers of tile, to illustrate the interlocking and overlapping relationship.
Figure 7:
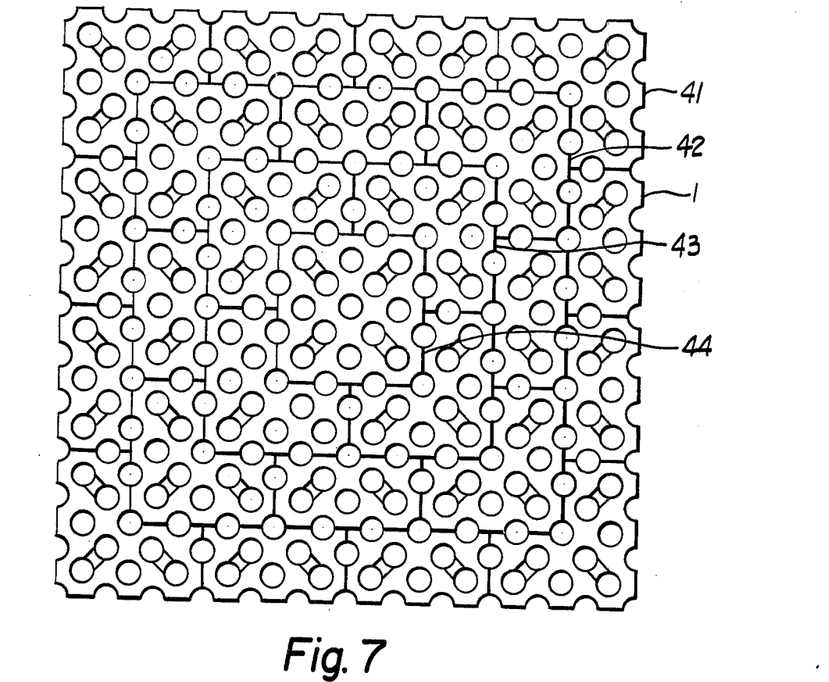
FIG. 7 is a plan of the courses of tile of FIG. 6, to the same scale.

FIGS. 6 and 7 show a partial checkerwork assembly of the checker tiles 1 of FIGS. 1-3. The checker tiles 1 in the lowermost course or layer 41 are disposed so that sides of the tiles are in abutting relation with sides of other contiguous identical checker tiles in the course. The corner checker tiles in the outer rows in such course abut the sides of two contiguous checker tiles; the intermediate checker tiles in the outer rows of such course abut the sides of three adjacent checker tiles; and the sides of the checker tiles within the outer rows of checker tiles in such course abut the sides of four adjacent checker tiles.

Moreover, half aperture grooves 10 in the side surfaces and quarter aperture grooves 11 at the corners of the abutting portions of the checker tiles in each course cooperate with corresponding grooves in adjacent checker tiles in the course to form complete apertures, all of the apertures thus formed being of the same size as the apertures within the boundaries of each checker tile and spaced in corresponding rows. The checker tiles in each of upper partial courses 42, 43, 44 of the partial checkerwork assembly of FIGS. 6 and 7 lie in similar relationship with the other checker tiles in that upper course.

Figure 8:
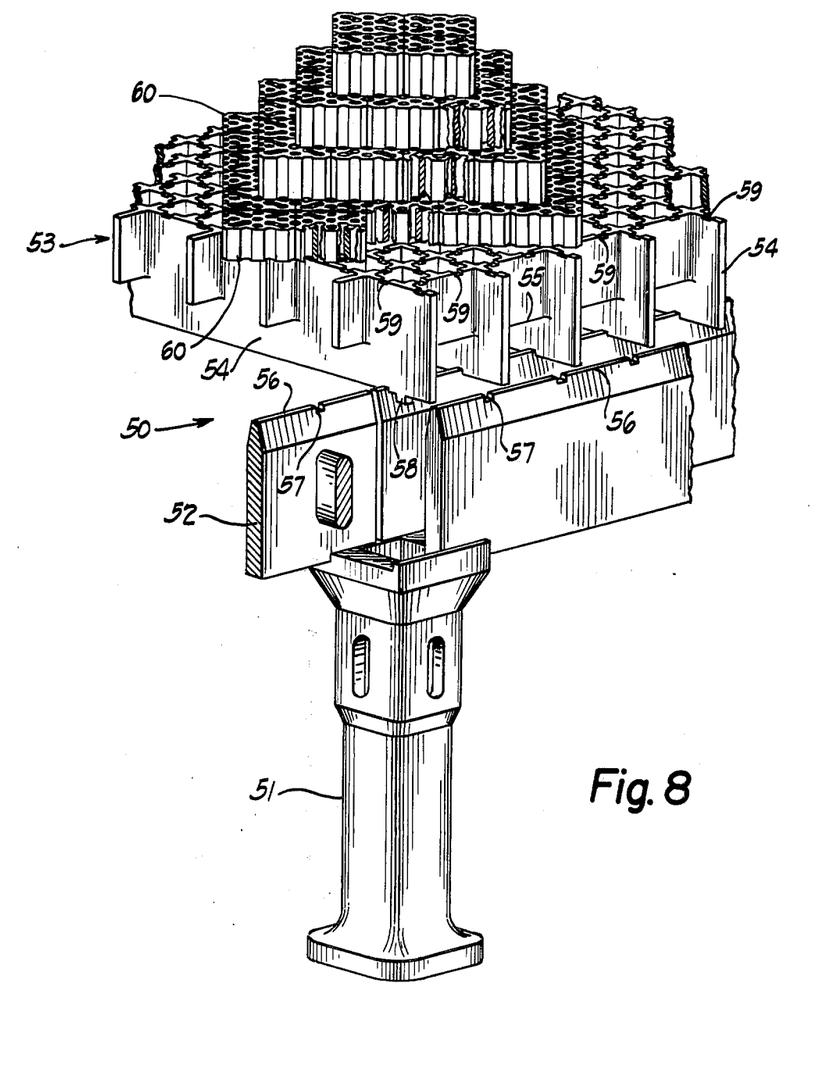
FIG. 8 is a perspective view of a portion of a supporting means of regenerative stove embodying the invention, shown as supporting partial courses of tiles of the kind illustrated by FIGS. 1-3 above, but to a substantially smaller scale.

Moreover, in this embodiment, the checker tiles in each intermediate course between contiguous upper and lower courses are in offset or staggered relationship with respect to the checker tiles in each adjacent contiguous course, and the checker tiles in contiguous upper and lower courses are identically located (FIGS. 6, 7, 8) so that the checker tiles in such intermediate course are in overlapping relation to the tiles in the contiguous upper and lower courses, preferably so that except at the outermost checker tiles the ends of each checker tile in an intermediate course contact the ends of four checker tiles in contiguous upper and lower courses, and also preferably so the opening formed by the corner grooves of four abutting tiles in the intermediate course is aligned with the center opening in a tile in the upper and lower contiguous courses. The overlapping relationship is such that there are staggered joints between checker tiles in contiguous courses, and the openings through the tiles are vertically aligned in contiguous courses.

Moreover, checker tiles in each intermediate course between contiguous upper and lower courses are so disposed with relation to the checker tiles in such contiguous upper and lower courses that ribs 8 and grooves 9 on opposed abutting ends of checker tiles in such intermediate course mate and interfit with rib 8 and grooves 9 of staggered checker tiles in the contiguous courses and interlock the tiles in such courses by the interfitting grooves and ribs.

Because of such mating arrangement the internal apertures of the checker tiles and the apertures formed by the external grooves and abutting checker tiles are aligned in the various courses from the uppermost to the lowermost courses at the base of the checkerwork. Consequently, such aligned apertures provide numerous essentially unobstructed passages for gas that extend through the checkerwork between the bottom and top of the checkerwork and that are of substantial cross sectional area. This results in low pressure drop between the bottom and top of the checkerwork, and efficient heat transfer between the checkerwork and gases.

Furthermore, since the checker tiles in adjacent courses are in staggered or offset relation, since the ribs and grooves of checker tiles in adjacent courses interlock, and since the grooves and ribs are disposed at angles to the sides of the checker tile, a firm interlocking checkerwork structure is provided with no possibility of substantial lateral relative movements of checker tiles relative to each other.

Moreover, when the checker tile are square as in the preferred embodiment and have their ribs and grooves disposed along diagonal axes passing from the corner to the center of the checker tile, they may be easily assembled in practically foolproof relation in the checkerwork in the stove.

However, the interlocking relationship permits the checker tiles to move slightly relatively to each other in the checker work, sufficiently to allow the tiles to accommodate themselves to changes in dimension due to changes in temperature. The fact that the grooves between the openings are open-ended, that is, terminate in the side walls of the openings, insures that there is no jamming of the end of a rib against an end of a groove that could cause breakage of checker tiles or disruption of the checkerwork on dimensional changes.

If desired, rectangular tiles such as those shown in FIGS. 4 and 5 may be used if they are provided with grooves and ribs properly located as in these figures. In general, however, such tiles can most advantageously be used for the inner surfaces of the outer walls of the stove where they may be cut or broken to conform to the contour of the walls.

FIGS. 8-11 illustrate another aspect of the invention according to which supporting means 50 supports checker tiles to minimize problems arising from dimensional changes due to temperature changes at the supporting structure at the bottom of the stove.

In these figures, columns 51, supported from the floor F, carry spaced parallel laterally extending beams 52. These beams support a plurality of laterally extending rigid supporting members 53, each illustrated as a grid made up of spaced laterally extending parallel upright wall members 54 rigidly connected by other spaced, laterally extending upright wall members 55 located at right angles to wall members 54. The upper edges 56 of beams 52 except notches 57 lie in a common essentially horizontal plane, to contact and support the lower edges of wall members 54 of supporting members 53. Certain of wall members 54 have downwardly extending lugs 58 that bear against certain beams 52 to cooperate with notches 57 in locating supporting members 53 against substantial movement laterally of beams 52 in any direction. The upper edges of wall members 54, 55 of all members 53 lie in a common essentially horizontal plane except for spaced notches 59 in the upper edges.

Figure 12:
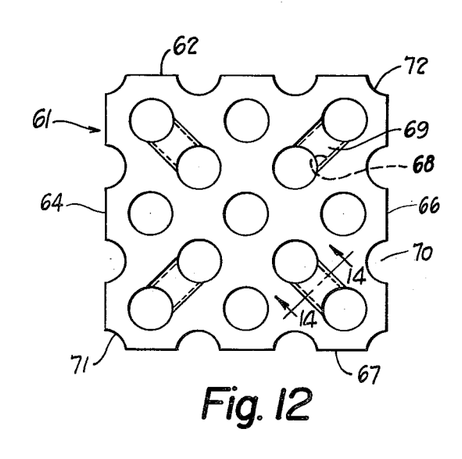
FIG. 12 is a plan of a metal shoe included in the supporting means of FIGS. 8-11, to the scale of FIG. 1.
Figures 13, 14:
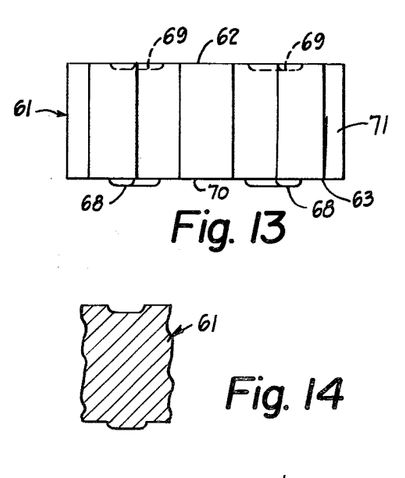
FIG. 13 is a side elevation of the shoe of FIG. 12 and to the same scale.
FIG. 14 is a section along line 14—14 of FIG. 12.

A course 60 of abutting metal supporting shoes 61 is supported on the upper edges of wall members 54, 55 of supporting members 53, and supports courses of checker tiles 1. Each of shoes 61 (FIGS. 12-14) is substantially similar in size and configuration to the checker tile 1 of FIGS. 1-3; shoe 61 has two generally flat square ends 62 and 63 and four generally flat rectangular parallel sides 64-66, the shoes having cross sections parallel to the ends that are essentially square in configuration and equal in cross sectional size and configuration to tile 1. Illustrated shoe 61 is of less thickness than tile 1. Each shoe has ribs 68 at one end and complementary grooves 69 at the other end, identical in size and location with the ribs 8 and grooves 9 of checker tile 1. Shoe 61 also has side channels or grooves 70 and corner channels or grooves 71, corresponding to the side grooves 10 and corner grooves 11 of the above described checker tile 1, located and shaped so that when the shoes are arranged in the lower course 60 these grooves define gas passages. Shoe 61 also has through apertures 73 and 75 spaced, arranged and sized identically with apertures 13, 14 and 15 of tile 1.

The ribs 68 at the bottoms of the shoes in course 60 fit in notches 59 of the wall members 54 and 55 of supporting members 53, the notches being spaced for the purpose and thus locate the shoes on the members 53 at essentially 45° to the walls 54 and 55. The grooves 69 at the top ends of the shoes 61 interfit with the ribs at the bottom ends of the lowermost course of checker tiles to interlock the tiles in such course with the shoes, as in the manner described above in the contiguous courses of tiles. Higher courses of checker tiles rest on lower courses of checker tile to complete the checkerwork. The course 60 of shoes 61 is related to the upper courses of tiles in the same manner as the tiles in the tile courses are related, and the apertures in the shoe course 60 match the apertures in the tile courses.

The illustrated structure is such that the course 60 of shoes 61 can move relatively to the supporting members 53, and the lowermost course of checker tile can move relatively to its supporting course of shoes as the grid members, shoes, and checker tiles change dimensions due to changing temperatures.

Moreover, according to the invention, preferably the contacting surfaces between the shoes 61 and checker tiles 1 have a lower coefficient of friction than the contacting surfaces between the shoes and the members 53, so that any relative movement that occurs at the bottom or supported end of the checkerwork occurs between the tiles and the shoes and not between courses of tiles, and thus eliminates or greatly reduces abrasion that could otherwise cause the checker tiles in the lowermost course to deteriorate or fail. This can be accomplished by machining or otherwise finishing or forming the horizontal tile-supporting surfaces at the upper ends of the shoes to a high degree of smoothness in comparison to the lower surfaces of the shoes.

Figure 9:
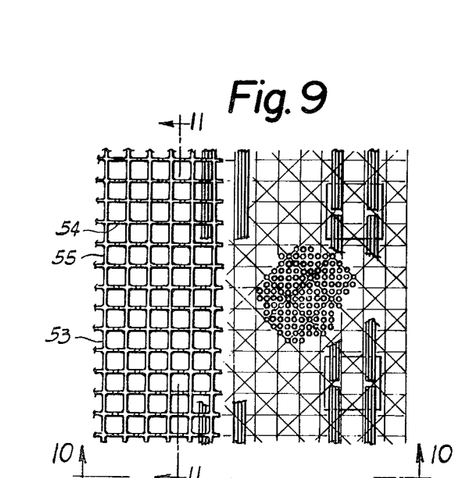
FIG. 9 is a plan of the apparatus portion of FIG. 8 and to a smaller scale.
Figure 10:
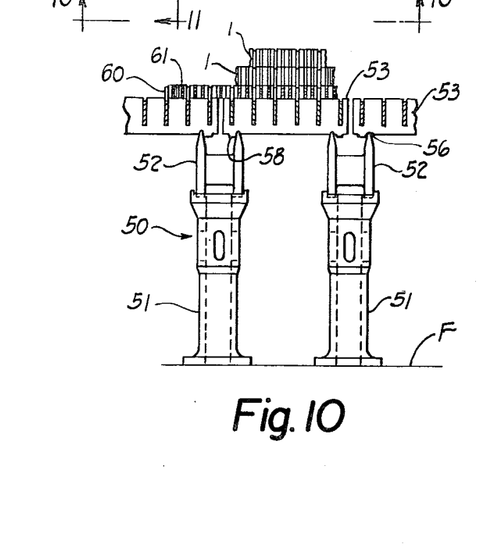
FIG. 10 is a side elevation of a portion of the apparatus of FIG. 8 viewed from line 10—10 of FIG. 9, and from the left of FIG. 8 but to a substantially smaller scale.
Figure 11:
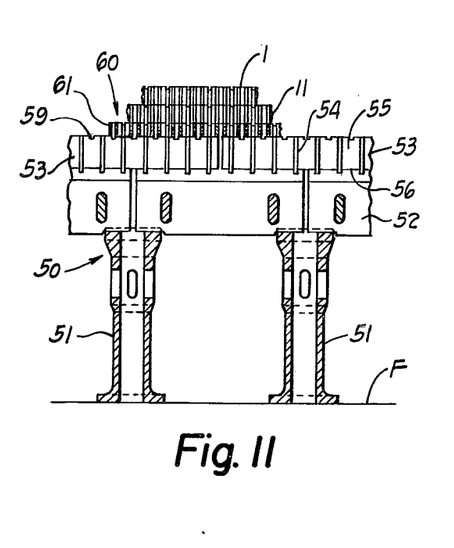
FIG. 11 is a section along line 11—11 of FIG. 9.
Figure 15:
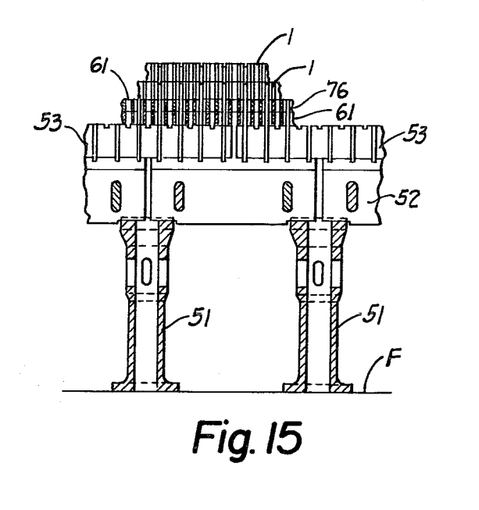
FIG. 15 is a view, corresponding in general to that of FIG. 11, but showing an embodiment of the invention comprising supporting means having two courses of supporting shoes.

If desired, two or more superposed courses or layers of supporting shoes can be used as shown in FIG. 15, which parts are identical to those of FIGS. 9-11 and bear identical reference numerals. In the structure of FIG. 15, the first or lowermost course 60 of shoes 61 rests on the supporting members 53 and a second or next lower course 76 of shoes 61 rests on the first course of shoes and supports the lowermost course of checker tiles 1. In such case, the contacting surfaces between the two courses 60 and 76 of shoes should be very smoothly finished so there is lower friction and preferential slidable contact between these surfaces when dimensional changes in the parts occur on thermal expansion and contraction of the tiles and shoes. Moreover, the upper surfaces of the shoes in the second layer 76 of shoes is also very smoothly finished so that there is substantially lower friction, and consequent preferential slidable contact, between such shoes and the tiles contacting such shoes as compared to the contacting support of tiles in two courses of tiles.

For example, if there are two courses of shoes, the upper tile-supporting surfaces of the shoes in the lower course of shoes and the lower and upper tile-supporting surfaces of the shoes in the upper courses of shoes preferably are finished considerably more smoothly than the bottom surfaces of the lower layer of shoes and the end surfaces of the next upper layer of tiles. In such case the amount of movement on expansion or contraction between the tiles in the lowermost course of tiles and the supporting members 53 would be divided, with part occurring between the two courses of shoes, and part between the upper course of shoes and the bottom course of tiles. This reduces relative movement between the lowermost layer of checker tiles and the supporting shoes on the members 53.

If desired, there could be more than two courses of shoes, with the contacting surfaces of the shoes in abutting courses being very smoothly finished and the shoe surfaces contacting the lowermost layer of tiles to further cause preferential sliding on thermal expansion and contraction, and to further divide the amount of relative movement between the tiles and their supportive members.

While the shoe used in the checkerwork described above is square in cross section, as is preferred, shoes of other rectangular cross section could be used. Moreover, metal shoes used near the curved walls of the shoes can be made with suitably curved sides to fit the stove wall, provided that the other portions of such shoes mate with the checker tiles they support.

Figures 16, 18:
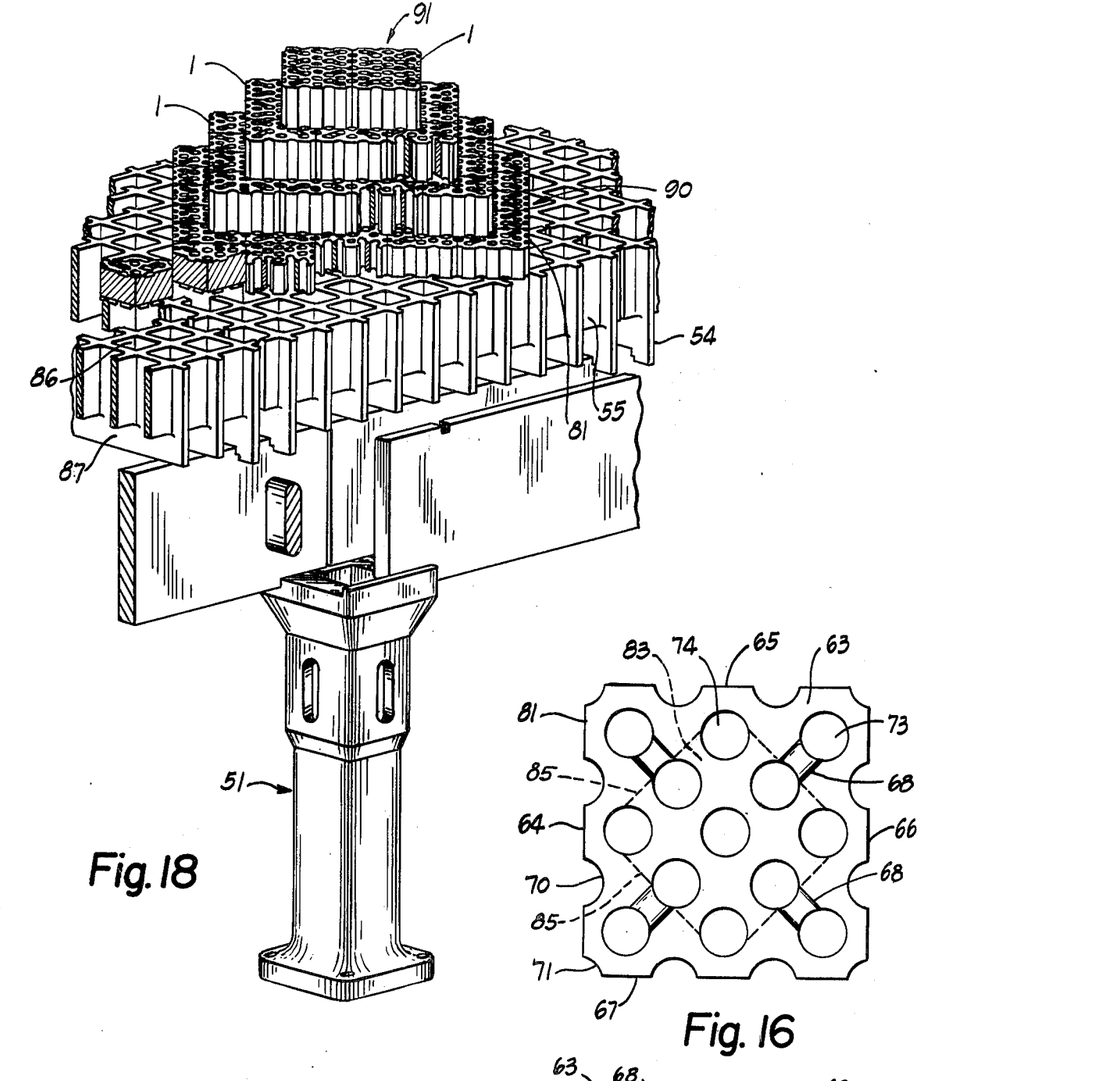
FIGS. 16-18 illustrate another embodiment of the invention in which the supporting shoes have different portions for interlocking with the supporting grid.
Figure 17:
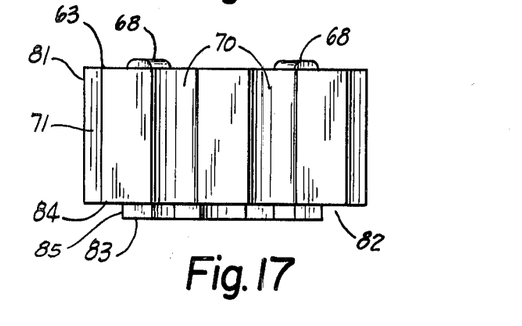

The embodiment of FIGS. 16 to 18 inclusive comprises, as shown in plan in FIG. 16 and in side elevation in FIG. 17, a metal shoe 81 that, like previously described shoe 61, is formed of suitably heat resistant metal and has sides 64, 65, 66 and 67, side and corner grooves 70 and 71, through apertures 73 and 74, and at its top end 63 has ribs 68 that are identical with and are located identically with the corresponding sides, side and corner grooves, apertures and ribs of shoe 61. Consequently, shoes 81 can mate with and have their ribs 68 interfit with corresponding grooves of tiles in an upper contiguous course of tiles or in another course of shoes, that are in overlapping or staggered arrangement to the shoes 81, similar to the arrangements of FIGS. 8 to 15. Illustrated shoe 81, in these respects, is similar to shoe 61, previously discussed, except that shoe 81 has ribs at its top rather than grooves, and that the lower end 82 of shoe 81 is formed, as shown by dotted lines of FIG. 16 and by FIG. 17, to have a boss or protuberance 83 that projects from surface 84 of the shoe and has sides 85 that are at 45° to the sides of the shoe and define a generally square cross section that closely approximates but is slightly smaller than the cross section of the generally square openings 86 between the wall members 54 and 55 of supporting grid members 87 as shown in FIG. 18. These grid members 87 are shown as identical with grid members 53 of the previous embodiment, but in this case the upper edges of the wall members 54 and 55 are not notched as in the previous embodiment, but may be smooth as shown since there is no need for such notches.

Since the bosses 83 on the bottoms of the shoes 81 in a bottom course 90 quite closely fit into the openings 86 between the wall members of the grid members 87 when the shoes are supported by the grid members, the bosses thus locate the shoes against all but quite limited lateral movement. The large thick cross sections of the bosses are most advantageous for this purpose.

The lower surface portion 84 of the shoes 81 or the flat surface of the upper end 63, or both surface portions, may be finished to a high degree of smoothness to provide the advantages of reduced friction and preferential sliding discussed previously.

Shoes 81 may be arranged in adjacent relation in a course 90 on grid members 87, and be interlocked by their ribs 68 with corresponding grooves in the bottoms of the tiles in the lowermost course of tiles of a checkerwork 91, similar to the arrangement of FIGS. 8–11; or the shoes 81 may also be so arranged on grid members 87 in a course 90 that is below another course of metal shoes similar to previously described shoes 61 that supports the tiles of the checkerwork, similar to the arrangement in FIG. 15. In the illustrated checkerwork 91 the tiles 1 are disposed with their ribs on their top ends and their grooves on their bottom ends, rather than with their ribs on their bottom ends and their grooves on the top ends, as in the previous embodiments.

All other portions of the apparatus shown in FIG. 18 may be identical with those of the embodiments of FIGS. 1–15, and therefore bear the same reference characters in this Figure.

While each of the supporting means illustrated above is shown as applicable to the tiles of the invention, it is apparent that the supporting means and the low friction surfaces providing preferential sliding can be used in connection with checkerwork built of other types of tiles.

In reach of the illustrated embodiments of the tiles and shoes, the ribs and corresponding rib-receiving grooves are shown located at 45° from the side walls, which is preferable since this makes possible easy, fast, fool-proof assembly of the tiles and shoes into a desired checkerwork, particularly when the tile or shoe is of square cross section. Other angular relationships of ribs and rib-receiving grooves could be used, but would not be as advantageous.

Moreover, the ribs and grooves may be of cross sectional shapes other than curved cross section shown, although that shown is advantageous because of the advantages it provides in fabrication, erection of checkerwork, and freedom from chipping or breaking in use. Furthermore, according to the invention, the ribs and mating grooves of the tiles are of such wide and deep cross sections and of such substantial lengths that they provide interlocking portions of great strength which reduce possibilities of misalignment of tiles in assembly and use, and thus aid in insuring proper alignment of gas passages for heat transfer purposes.

Although it is possible to use other arrangements and sizes and shapes of apertures, those shown in the illustrative tiles and shoes are preferable, particularly in tiles and shoes of square cross section, for similar reasons in making possible simple, fast, foolproof assembly into a desired checkerwork. The arrangement of apertures of equal size equidistantly in rows along axes 45° to the sides of the tile or shoe, and also equidistantly in rows along axes parallel to the sides of the tile or shoe, with the ribs and rib-receiving grooves on the 45° axes makes it virtually impossible to wrongly assemble the tiles or shoes into a checkerwork, especially if they are of square cross section.

Furthermore, as is apparent from the above disclosures, the tiles may be arranged in a checkerwork so that downwardly projecting ribs engage upwardly facing grooves of tiles in contiguous courses, or vice versa; similar relationships can exist between the ribs and grooves of shoes and tiles in contiguous courses.

The invention, therefore, provides tiles and supporting means which overcome the disadvantages of prior structures and makes possible long-lasting durable interlocking checkerwork structures in regenerative stoves.

While the invention has been shown and described in connection with specific embodiments thereof, these are intended for the purposes of illustration rather than limitation, and other modifications and variations in the embodiments herein shown and described, and other embodiments of the invention, will be apparent to those skilled in the art, all within the intended scope of the invention. Accordingly, the patent is not to be limited to the specific embodiments herein shown and described, nor in any other way that is inconsistent with the extent to which the progress in the art has been advanced by the invention.

What is claimed is:

1. A checker tile comprising a tile portion generally of the shape of a parallelepiped having two oppositely facing ends and four sides intersecting said ends and forming a boundary for said tile portion, said ends of said tile portion being each generally square and having a pair of substantially straight diagonal axes which extend between opposite corners of said tile portion and which intersect generally in the center of the end, said tile portion having a plurality of symmetrically spaced apertures which extend through the tile portion between the ends, said tile portion also having rib means and groove means extending on the ends of said tile portion between pairs of said apertures and terminating entirely within said boundary, said rib means and groove means being located along said axes on both sides of the intersection of the axes, said groove means being adapted to receive and fit closely rib means on an abutting end of another checker tile.

2. The checker tile of claim 1 comprising in addition a second tile portion integrally formed with said first-mentioned tile portion on one of said sides of the first tile portion, the checker tile formed by said first and second tile portions together having a cross section in the general shape of a rectangle.

3. The checker tile of claim 1 in which said tile portion has a plurality of ribs on one end of said tile portion between pairs of apertures, and a plurality of grooves at the opposite end of said tile portion between pairs of apertures, said grooves being adapted to receive and fit closely ribs on the abutting ends of other checker tiles which ribs are identical in cross section to said ribs on the tile of this claim.

4. The checker tile of claim 3 in which said sides of said tile portion have elongated external channels extending between said ends of said tile portion and adapted to mate with corresponding channels on sides of side-abutting tiles to form apertures extending between the ends of said abutting tiles.

5. The checker tile of claim 3 in which all of said ribs are on one end of said tile portion and all of said grooves are on the other end of said tile portion.

6. The checker tile of claim 1 in which said sides have elongated external channels extending between said ends of said tile portion and adapted to mate with corresponding channels on the sides of side-abutting tiles to form apertures extending between the ends of said abutting tiles.

7. The checker tile of claim 1 in which one group of said apertures is disposed in a first row along one of said diagonal axes, and another group of said apertures is disposed in a second row along the other of said diagonal axes.

8. The checker tile of claim 7 in which pairs of adjacent apertures in said first and second rows of apertures have ribs extending between said pairs of apertures on at least one end of said tile portion and grooves extending between said same pairs of apertures on at least the other end of said tile portion.

9. The checker tile of claim 8 in which said apertures are all of generally circular cross section and have identical diameters.

10. The checker tile of claim 8 in which said apertures are all identical in size and shape, and said apertures in each row are equidistantly spaced in the row.

11. The checker tile of claim 10 in which there are a plurality of ribs between pairs of apertures in each of said rows and a plurality of grooves between pairs of apertures in each of said rows.

12. The checker tile of claim 11 in which all of said ribs are on one end of said tile portion and all of said grooves are on the other end of said tile portion.

13. The checker tile of claim 7 in which said other apertures are disposed in rows that are parallel to said axes, the apertures in all of said rows being substantially equally spaced.

14. A checker tile comprising a tile portion generally of the form of a parallelepiped having two generally flat generally parallel oppositely facing ends and four generally flat sides intersecting said ends and forming a boundary for the tile portion that has a cross section parallel to said ends in the general shape of a square, said ends of said tile portion also being generally square and having first and second substantially straight diagonal axes which extend between opposite corners of said tile portion and which intersect generally in the center of the end, said tile portion having a plurality of symmetrically spaced apertures that extend through the tile portion between its ends, one group of said apertures being disposed in a first row along said first diagonal axis, another group of said apertures being disposed in a second row along said second diagonal axis, said tile portion having ribs extending on at least one end of said tile portion between pairs of adjacent apertures in said first and second rows, said ribs being located along said axes on opposite sides of the intersection of said axes, said tile portion also having complementary grooves on at least the other end of said tile portion, said grooves extending between said same pairs of apertures, said ribs and grooves terminating within said boundary, there being on each end of said tile portion a total of at least four ribs and grooves, said sides of said tile portion having elongated external channels extending between said ends of said tile portion and adapted to mate with corresponding channels on the sides of adjacent tiles to form apertures extending between the ends of said adjacent tiles.

15. The checker tile of claim 14 in which said apertures are all identical in size and shape, and said apertures in each row are equidistantly spaced in the row.

16. The checker tile of claim 15 in which all of said ribs are on one end of said checker tile and all of said grooves are on the other end of said checker tile.

17. The checker tile of claim 14 in which all of said ribs are on one end of said checker tile and all of said grooves are on the other end of said checker tile.

18. The checker tile of claim 14 comprising in addition a second tile portion integrally formed with said first-mentioned tile portion on one of said sides of the first tile portion, the checker tile formed by said first and second tile portions together having a cross section in the general shape of a rectangle.

19. A metal shoe for supporting checkerwork, said shoe comprising a shoe portion generally of the form of a parallelepiped having two generally flat generally parallel oppositely facing ends and four generally flat sides intersecting said ends and forming a boundary for the shoe portion that has a cross section parallel to said ends in the general shape of a square, said ends of said shoe portion also being generally square and having first and second substantially straight diagonal axes which extend between opposite corners of said shoe portion and which intersect generally in the center of the end, said shoe portion having a plurality of symmetrically spaced apertures that extend through the shoe portion between its ends, one group of said apertures being disposed in a first row along said first diagonal axis, another group of said apertures being disposed in a second row along said second diagonal axis, said shoe portion having at least four interlocking means on at least one end of said shoe portion extending along said axes on opposite sides of the intersection of said axes, said interlocking means comprising one of a rib extending between a pair of adjacent apertures in said first and second rows and a groove extending between said pair of apertures and terminating within said boundary, said sides of said shoe portion having elongated external channels extending between said ends of said shoe portion adapted to mate with corresponding channels on the sides of adjacent shoes to form apertures extending between the ends of said abutting shoes.

20. The shoe of claim 19 in which said apertures are all identical in size and shape, and said apertures in each row are equidistantly spaced in the row.

21. The shoe of claim 19 in which there are a plurality of ribs between pairs of apertures in each row and a plurality of grooves between pairs of apertures in each row.

22. The shoe of claim 21 in which all of said ribs are on one end of said shoe portion and all of said grooves are on the other end of said shoe portion.

23. A checker tile generally of the form of a parallelepiped having two generally flat generally parallel oppositely facing ends and four generally flat sides intersecting said ends and forming a boundary for the tile that has a cross section parallel to said ends in the general shape of a square, said ends also being generally square and having first and second substantially straight diagonal axes which extend between opposite corners of said tile and which intersect generally in the center of the end, said checker tile having a plurality of symmetrically spaced apertures that extend through the tile between its ends, one group of said apertures being disposed in a first row along said first diagonal axis, another group of said apertures being disposed in a second row along said second diagonal axis, said checker tile having ribs extending on at least one end of said tile between at least two pairs of adjacent apertures in each of said first and second rows, said ribs being located along said axes on opposite sides of the intersection of said axes, said checker tile also having complementary grooves on at least the other end of said tile, said grooves extending between said same pairs of apertures, said ribs and grooves terminating within said boundary, said sides of said tile having elongated external channels extending between said ends of said tile and adapted to mate with corresponding channels on the sides of adjacent tiles to form apertures extending between the ends of said adjacent tiles.

24. A metal shoe for supporting checkerwork, said shoe being generally of the form of a parallelepiped having two generally flat generally parallel oppositely facing ends and four generally flat sides intersecting said ends and forming a boundary for the shoe that has a cross section parallel to said ends in the general shape of a square, said ends also being generally square and having first and second substantially straight diagonal axes which extend between opposite corners of said tile and which intersect generally in the center of the end, said shoe having a plurality of symmetrically spaced apertures that extend through the shoe between its ends, one group of said apertures being disposed in a first row along said first diagonal axis, another group of said apertures being disposed in a second row along said second diagonal axis, said shoe having interlocking means on at least one end of said shoe extending along said axes on opposite sides of the intersection of said axes, said interlocking means comprising one of a rib extending between at least two pairs of apertures in said first and second rows and a groove extending between said pair of apertures, said rib and groove terminating within said boundary, said sides of said shoe having elongated external channels extending between said ends of said shoe adapted to mate with corresponding channels on the sides of adjacent shoes to form apertures extending between the ends of said abutting shoes.

25. A checkerwork construction for regenerative heating stoves comprising a plurality of courses of checkerwork tiles; each of which tiles having a tile portion generally of the form of a parallelepiped having two generally flat generally parallel oppositely facing ends and four generally flat sides intersecting said ends and forming a boundary for the tile portion that has a cross section parallel to said ends in the general shape of a square, said ends of said tile portion also being generally square and having first and second substantially straight diagonal axes which extend between opposite corners of said tile portion and which intersect generally in the center of the end, said tile portion having a plurality of symmetrically spaced apertures that extend through the tile portion between its ends, one group of said apertures being disposed in a first row along said first diagonal axis, another group of said apertures being disposed in a second row along said second diagonal axis, said tile portion having ribs extending on at least one end of said tile portion between pairs of adjacent apertures in said first and second rows, said ribs being located along said axes on opposite sides of the intersection of said axes, said tile portion also having complementary grooves on at least the other end of said tile portion, said grooves extending between said same pairs of apertures, said ribs and grooves terminating within said boundary, said sides of said tile portion having elongated external channels extending between said ends of said tile portion and adapted to mate with corresponding channels on the sides of side-abutting tiles to form apertures extending between the ends of said abutting tiles, there being on each end of said tile portion a total of at least four ribs and grooves; the ribs of tiles in each course coacting with grooves of tiles in contiguous courses and with the apertures of the tiles of each course in registration with the apertures of the tiles of other courses, a plurality of the tiles in a contiguous course each being in overlapping relation with four tiles in an adjacent contiguous course and the channels in the sides of the tiles in each course forming apertures that are aligned with apertures in the tiles of contiguous courses to form a plurality of vertically aligned apertures extending from the bottom to the top of said checkerwork.

26. The checkerwork construction of claim 25 comprising a course of shoes; each of said shoes having a shoe portion generally of the form of a parallelepiped having two generally flat generally parallel oppositely facing ends and four generally flat sides intersecting said ends and forming a boundary for the shoe portion that has a cross section parallel to said ends in the general shape of a square, said ends of said shoe portion also being generally square and having first and second substantially straight diagonal axes which extend between opposite corners of said shoe portion and which intersect generally in the center of the end, said shoe portion having a plurality of symmetrically spaced apertures that extend through the shoe portion between its ends, one group of said apertures being disposed in a first row along said first diagonal axis, another group of said apertures being disposed in a second row along said second diagonal axis, said shoe portion having interlocking means on at least one end of said shoe portion extending along said axes on opposite sides of the intersection of said axes, said interlocking means comprising one of a rib extending between a pair of adjacent apertures in said first and second rows and a groove extending between said pair of apertures, said rib and groove terminating within said boundary, said sides of said shoe portion having elongated external channels extending between said ends of said shoe portion adapted to mate with corresponding channels on the sides of side-abutting shoes to form apertures extending between the ends of said abutting shoes; the shoes in said course being arranged in abutting relation and in overlapping relation with respect to the tiles in the bottom course of said checkerwork, so that ribs and grooves of said shoes and tiles engage and so that the channels at the sides of the shoes form apertures that are aligned with apertures in said tiles to form a plurality of apertures that extend from the bottom to the top of the construction including said course of shoes.

* * * * *